(12) United States Patent
Sutardja et al.

(10) Patent No.: US 9,363,346 B2
(45) Date of Patent: Jun. 7, 2016

(54) REMOTE CONTROL OF NETWORK APPLIANCES USING VOICE OVER INTERNET PROTOCOL PHONE

(75) Inventors: Sehat Sutardja, Los Altos Hills, CA (US); Hubertus Notohamiprodjo, Union City, CA (US)

(73) Assignee: Marvell World Trade Ltd., St. Michael (BB)

( * ) Notice: Subject to any disclaimer, the term of this patent is extended or adjusted under 35 U.S.C. 154(b) by 3036 days.

(21) Appl. No.: 11/504,093

(22) Filed: Aug. 14, 2006

(65) Prior Publication Data

US 2007/0263600 A1    Nov. 15, 2007

Related U.S. Application Data

(60) Provisional application No. 60/821,005, filed on Aug. 1, 2006, provisional application No. 60/799,289, filed on May 10, 2006.

(51) Int. Cl.
*H04M 1/253* (2006.01)
*H04M 1/725* (2006.01)

(52) U.S. Cl.
CPC ........ *H04M 1/2535* (2013.01); *H04M 1/72533* (2013.01); *G08C 2201/31* (2013.01); *G08C 2201/42* (2013.01)

(58) Field of Classification Search
CPC .......... G08C 2201/31; G08C 2201/42; H04M 1/2535; H04M 1/72533
USPC ................ 370/352; 709/217, 245; 455/404.1
See application file for complete search history.

(56) References Cited

U.S. PATENT DOCUMENTS

| | | | |
|---|---|---|---|
| 7,460,467 B1* | 12/2008 | Corcoran | 370/208 |
| 2002/0147814 A1* | 10/2002 | Kimchi et al. | 709/226 |
| 2006/0009190 A1* | 1/2006 | Laliberte | 455/404.1 |
| 2006/0041916 A1 | 2/2006 | McQuaide, Jr. | |
| 2006/0044106 A1 | 3/2006 | Kirose et al. | |
| 2006/0095158 A1 | 5/2006 | Lee et al. | |
| 2006/0190265 A1* | 8/2006 | Kurganov et al. | 704/270.1 |

(Continued)

FOREIGN PATENT DOCUMENTS

| | | |
|---|---|---|
| CN | 1726482 | 1/2006 |
| CN | 1765595 | 5/2006 |
| GB | 2 419 687 A | 5/2006 |

(Continued)

OTHER PUBLICATIONS

Communication and extended European Search Report from the European Patent Office dated Sep. 10, 2007 for Application No. 07 005 937.3; 7 pages.

(Continued)

*Primary Examiner* — Khaled Kassim

(57) ABSTRACT

A Voice Over Internet Protocol (VOIP) phone comprises a network interface that communicates with a medium. A control module communicates with the network interface and controls operation of the VOIP phone. A coder/decoder module communicates with the control module. A microphone outputs audio signals to the coder/decoder module. An audio output device receives audio signals from the coder/decoder module. An input/output interface receives user input. The control module and the network interface transmit the user input as packets to a network appliance to adjust an operating parameter of the network appliance.

21 Claims, 10 Drawing Sheets

(56) References Cited

U.S. PATENT DOCUMENTS

| | | | |
|---|---|---|---|
| 2006/0209857 A1* | 9/2006 | Hicks, III | 370/401 |
| 2007/0194138 A9* | 8/2007 | Shah | 236/46 R |

FOREIGN PATENT DOCUMENTS

| | | |
|---|---|---|
| JP | 11-318666 | 11/1999 |
| JP | 2000-330650 | 11/2000 |
| JP | 2002-185626 | 6/2002 |
| JP | 2003-115939 | 4/2003 |
| JP | 2004 110559 A | 4/2004 |
| JP | 2005-303466 | 10/2005 |
| WO | WO2004049737 | 6/2004 |

OTHER PUBLICATIONS

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; 131 pages.

IEEE Std 802.16/2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

Correspondence mailed May 11, 2012 enclosing Final Rejection for Japanese Application No. 2007-102557; 8 pages.

Correspondence mailed Aug. 31, 2011 enclosing First Office Action for Chinese Patent Application No. 200710093723.0; 19 pages.

Correspondence mailed Nov. 15, 2011 enclosing Notice of Reasons for Rejection for Japanese Application No. 2007-102557; 9 pages.

* cited by examiner

REMOTE CONTROL OF NETWORK APPLIANCES USING VOICE OVER INTERNET PROTOCOL PHONE

CROSS-REFERENCE TO RELATED APPLICATIONS

This application claims the benefit of U.S. Provisional Application No. 60/821,005, filed on Aug. 1, 2006, and U.S. Provisional Application No. 60/799,289, filed on May 10, 2006. The disclosure of the above application is incorporated herein by reference in its entirety.

FIELD

The present disclosure relates to Voice Over Internet Protocol (VOIP) phones.

BACKGROUND

There are several different ways of implementing Voice Over Internet Protocol (VOIP). For example, an analog telephone adaptor (ATA) can be used to allow a standard phone to connect to the Internet via a computer. The ATA includes an analog-to-digital (A/D) converter and a coder/decoder that converts the analog signals from the standard phone to digital data for transmission over the Internet. The coder/decoder may also perform coding/decoding and/or compression/decompression.

Internet protocol (VOIP) phones can be used instead of the standard phone and typically include an Ethernet connector such as an RJ-45 connector. VOIP phones connect directly to a router (or wirelessly to an access point) and directly handle the phone calls. Computers can also be programmed to perform as VOIP phones using an Internet connection and the microphone and speakers of the computer.

VOIP technology uses packet-switching capabilities of the Internet to provide phone service. VOIP has several advantages over circuit switching. For example, packet switching allows several telephone calls to occupy the same bandwidth occupied by only one call in a circuit-switched network.

SUMMARY

A Voice Over Internet Protocol (VOIP) phone comprises a network interface that communicates with a medium. A control module communicates with the network interface and controls operation of the VOIP phone. A coder/decoder module communicates with the control module. A microphone outputs audio signals to the coder/decoder module. An audio output device receives audio signals from the coder/decoder module. An input/output interface receives user input. The control module and the network interface transmit the user input as packets to a network appliance to adjust an operating parameter of the network appliance.

In other features, the network interface includes at least one of a wireless network interface and a wired network interface. The network appliance includes one of a wireless network interface and a wired network interface.

In other features, a system comprises the VOIP phone and further comprises the wireless network appliance that communicates with the VOIP phone using a peer-to-peer mode. Alternately, a system comprises the VOIP phone and further comprises the network appliance that communicates with the VOIP phone. Alternately, a system comprises the VOIP phone and further comprises the network appliance that wirelessly communicates with the VOIP phone using an infrastructure mode. The network appliance may be located in a remote network.

In other features, a system comprises the VOIP phone and further comprises a router that communicates with the wired network interface and a wired network appliance that communicates with the VOIP phone via the router.

In other features, a system comprises the VOIP phone and further comprises the network appliance. The network appliance includes at least one of a thermostat, an audio system, a lighting controller and a window shade controller. The VOIP phone includes at least one of a keypad, a touchpad and a display for receiving the user input to alter the operating parameters. In other features, the network appliance further includes a setpoint temperature arbitrator that selects a setpoint temperature based on a setpoint program when setpoint temperatures have not been received within a first predetermined period, a single setpoint temperature when one setpoint temperature has been received within a second predetermined period, and a function of a plurality of setpoint temperatures when more than one setpoint temperature has been received within a third predetermined period.

A computer program executed by a processor for operating a Voice Over Internet Protocol (VOIP) phone, comprises providing a network interface that communicates with a medium; controlling operation of the VOIP phone; coding audio input signals; decoding audio output signals; receiving user input at the VOIP phone; and transmitting the user input to a network appliance using the network interface to adjust an operating parameter of the network appliance.

In other features, the network interface includes a wireless and/or wired network interface. The computer program includes communicating with the VOIP phone using one of a peer-to-peer mode and an infrastructure mode. The network appliance includes at least one of a thermostat, an audio system, a window shade controller and a lighting controller.

In other features, the computer program includes selecting a setpoint temperature. The selecting includes selecting the setpoint temperature based on a setpoint program when setpoint temperatures has not been received within a first predetermined period, a single setpoint temperature when one setpoint temperature has been received within a second predetermined period, and a function of a plurality of setpoint temperatures when more than one setpoint temperature has been received within a third predetermined period.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
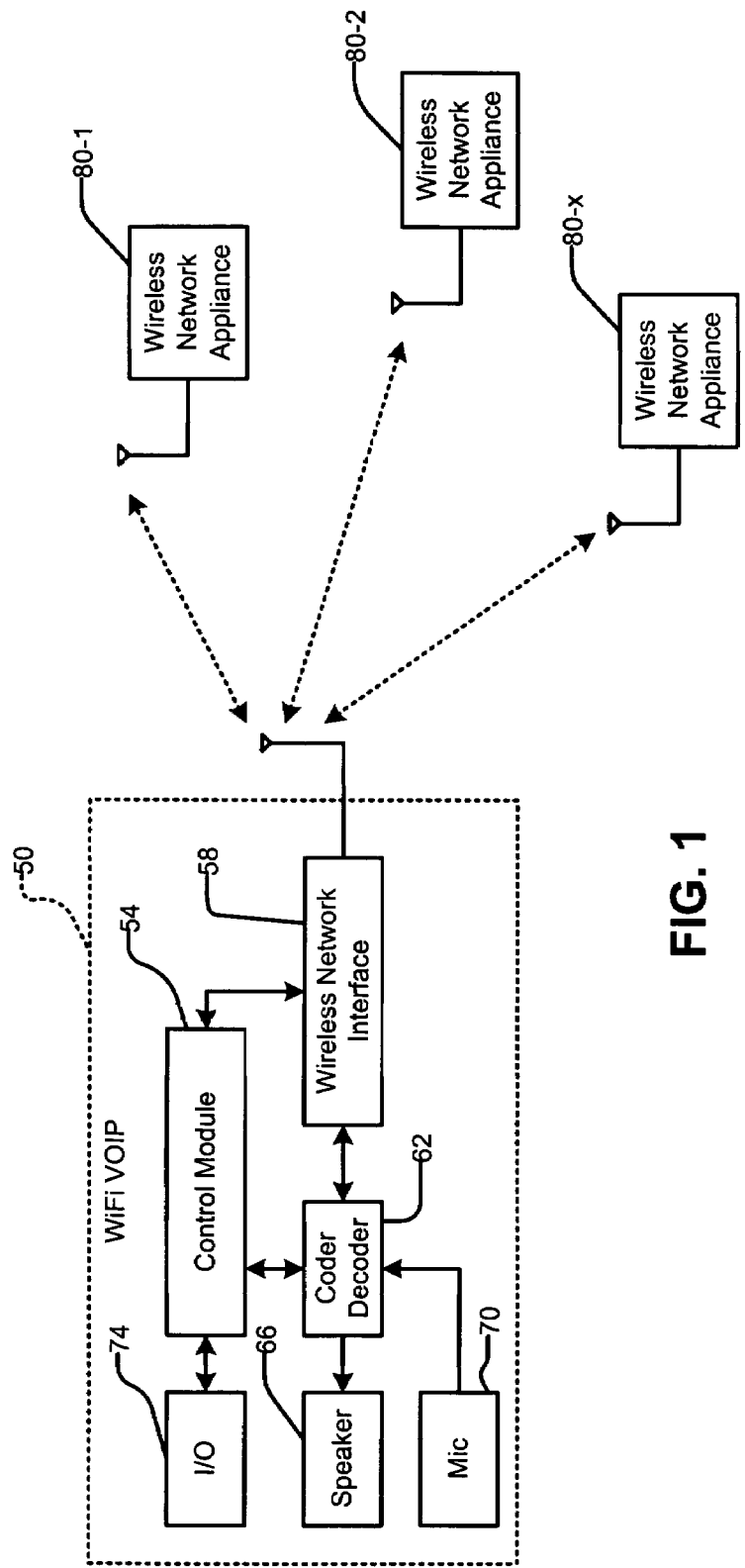
FIG. 1 is a functional block diagram of a VOIP phone that selectively remotely controls a network appliance according to the present disclosure.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Wireless and/or wired VOIP phones according to the present disclosure can be used to control one or more operating parameters of wireless and/or wired network appliances. The wireless and/or wired VOIP phones provide an interface such as a keyboard, a touchpad and/or a display that can be used to control the network appliances.

Referring now to FIG. 1, a wireless VOIP phone 50 that remotely controls a network appliance is shown. The wireless VOIP phone 50 includes a control module 54 that performs data processing and other control functions of the wireless VOIP phone 50. A wireless network interface 58 communicates with the control module 54 and provides a wireless interface to a wireless medium. The wireless network interface 58 may be compliant with any suitable wireless network protocol. Examples of suitable protocols include IEEE standards 802.11, 802.11a, 802.11b, 802.11g, 802.11n, 802.16, and 802.20 (which are incorporated by reference in their entirety) and/or Bluetooth.

The control module 54 of the wireless VOIP phone 50 may support caller identification (ID), call waiting, call transfer, repeat dial, return call, and/or three-way calling. Additional supported functions may include forwarding a call to a particular number, sending a call directly to voicemail, giving a caller a busy signal, playing a "not-in-service" message, sending a caller to a call rejection hotline, etc.

The control module 54 and/or the wireless network interface 58 communicate with a coder/decoder module 62. The coder/decoder module 62 may convert an audio signal from a microphone into a compressed digital form for transmission. Audio from the other end of the call is decompressed and replayed on speakers. For example, the coder/decoder 62 may include a G.729A coder/decoder, a G.711 coder/decoder or any other suitable coder/decoder.

The coder/decoder 62 may convert each sample into digitized data and may compress it for transmission. The coder/decoder 62 may operate by using algorithms that sample, sort, compress and packetize audio data. For example, the coder/decoder 62 may include a conjugate-structure algebraic-code-excited linear prediction (CS-ACELP) algorithm. Other algorithms may also be used.

The coder/decoder 62 communicates with an audio output device such as an output jack and/or a speaker 66. The coder/decoder 62 also may communicate with an audio input device such as a microphone 70. The control module 54 also may communicate with input/output devices 74. The input/output devices 74 may include a keypad and/or touchpad, a display and/or other input/output devices. The wireless network interface 58 communicates with one or more wireless network appliances 80-1, 80-2, . . . , and 80-X (collectively wireless network appliances 80), where X is an integer greater than zero. The wireless VOIP phone 50 generates packets that are sent to the network appliance to control operating parameters thereof.

In FIG. 1, the wireless network interface 58 may communicate with the wireless network appliances 80 using an ad-hoc or peer-to-peer mode. However, the wireless network interface 58 may also communicate using an infrastructure mode via an access point.

In use, the user can move about with the wireless VOIP phone 50 within the range of one or more of the wireless network appliances 80. If the user wishes to remotely control an operating parameter of one of the wireless network appliances 80, the user manipulates the input/output device 74 of the wireless VOIP phone 50 to effectuate control of one or more of the wireless network appliances 80. The control module 54 may provide a suitable graphical user interface (GUI) via a display of the input/output device 74. For example, the control module 54 may provide a selectable list of available network appliances. Once a particular wireless network appliance is selected, the control module 54 may provide another menu and/or list of available functions or operating parameters, and/or a remote control interface and/or touchpad screen that is specific to the selected wireless network appliance.

Figure 2:
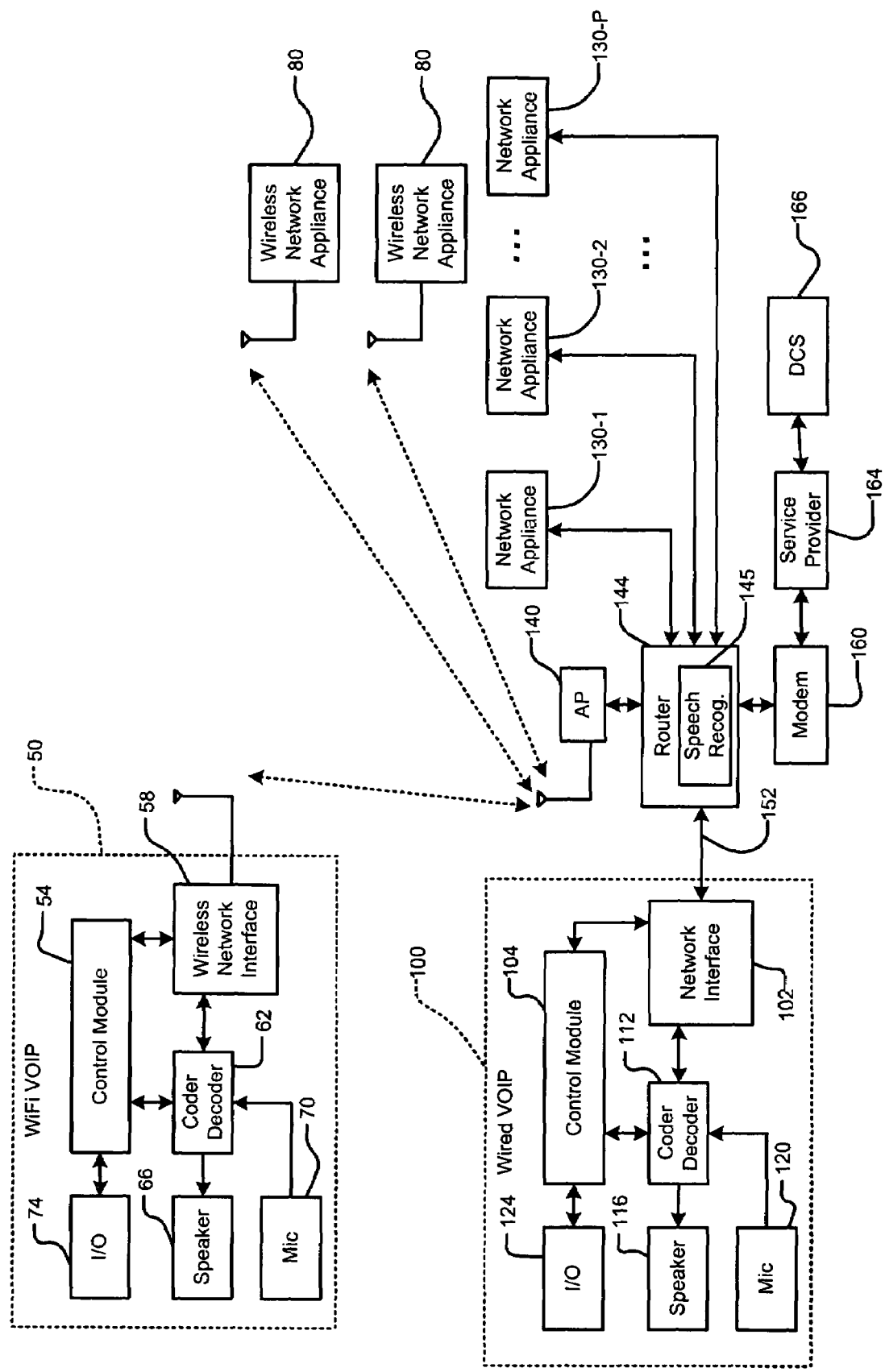
FIG. 2 is a functional block diagram of wireless and/or wired VOIP phones that selectively remotely control wireless and/or wired network appliances according to the present disclosure.

Referring now to FIG. 2, wireless and/or wired VOIP phones that remotely control wireless and/or wired network appliances are shown. The wireless VOIP phone 50 operates in a similar manner as described above. A wired VOIP phone 100 includes a wired network interface 102 instead of or in addition to the wireless network interface described above. The VOIP phone 100 includes a control module 104 that controls operation of the VOIP phone 100. The wired network interface 102 communicates with the control module 104 and provides an interface to a wired medium. The network interface 102 may be an Ethernet-based network interface. The wired medium may be copper and/or fiber optic-based.

The control module 104 and/or the wired network interface 102 communicate with a coder/decoder 112. The coder/decoder 112, in turn, communicates with an audio output such as an output jack and/or a speaker 116. The coder/decoder 112 also communicates with an audio input device such as a microphone 120 to receive audio input. The control module 104 also communicates with input/output devices 124. The input/output devices 124 may include a keypad, touchpad, a display and/or other input/output devices.

The wireless VOIP phone 50 and the wired VOIP phone 100 communicate with wireless network appliances 80 and/or wired network appliances 130-1, 130-2, . . . , and 130-P (collectively wired network appliances 130) as will be described below. For example, the wireless VOIP phone 50 transmits packetized voice, control and/or other data wirelessly to an access point 140, which is connected to a router 144.

In some implementations, the router 144 may include a speech recognition module 145. Selection of the network appliance and/or control of the network appliance may be performed using voice commands that are sent by the VOIP phone to the speech recognition module. Alternately, the network appliance can be selected using the input device on the VOIP phone and control of the selected network appliance can be performed using voice commands. In operation, the user may verbally initiate a command mode by stating a command keyword such as "Command" or another word. Alternately, one or more buttons or other input devices associated with the VOIP phone may be used to initiate the command mode.

The speech recognition module 145 may respond to the command keyword or button by sending a command mode acknowledgement. For example, the speech recognition module 145 may send a packet that triggers the VOIP phone to output a tone. Alternately the packet may include a tone. Then, the user selects the network appliance and/or states a command for the network appliance. The VOIP phone sends the command to the speech recognition module 145, which performs speech recognition on the command and outputs a packet to the target network appliance. If one or more target network appliances can be controlled, the user may specify the particular target appliance either before or after the command.

The router 144, in turn, is connected to wired network appliances 130. When the wireless network interface 58 of the wireless VOIP phone 50 transmits packetized data for a wired network appliance 130, the access point 140 forwards the packets to the router 144, which routes the packets to the correct wired network appliance 130.

The wireless VOIP phone 50 may also send packetized voice, control and/or other data to one or more of the wireless network appliances 80. When the access point 140 receives packetized data addressed to one of the wireless network appliances 80, the access point 140 wirelessly retransmits the data to the wireless network appliance 80. As can be appreciated, the wireless VOIP phone 50 may also communicate with the wireless network appliances 80 using a peer-to-peer mode as described above in FIG. 1.

Likewise, the wired VOIP phone 100 may also send packetized data via the wired medium 152 to the router 144. When the packets are addressed to one or more of the wired network appliances 130, the router 144 forwards the packets directly to the wired network appliance 130. When the packets are addressed to one or more of the wireless network appliances 80, the router 144 routes the packets to the wireless network appliance 80 using the access point 140.

As can be appreciated, the router 144 may also route packetized data to control either wired and/or wireless network appliances that are located in remote networks via a modem 160, a service provider 164 and a distributed communications system 166, such as the Internet. As used herein the term remote network includes networks that are not local to the local network including the VOIP phone. In other words, remote networks may include networks that are accessed indirectly via one or more routers, via distributed communications system such as the Internet, etc. Therefore, the range of the wireless remote control provided by the VOIP phone is relatively limitless.

Figure 3:
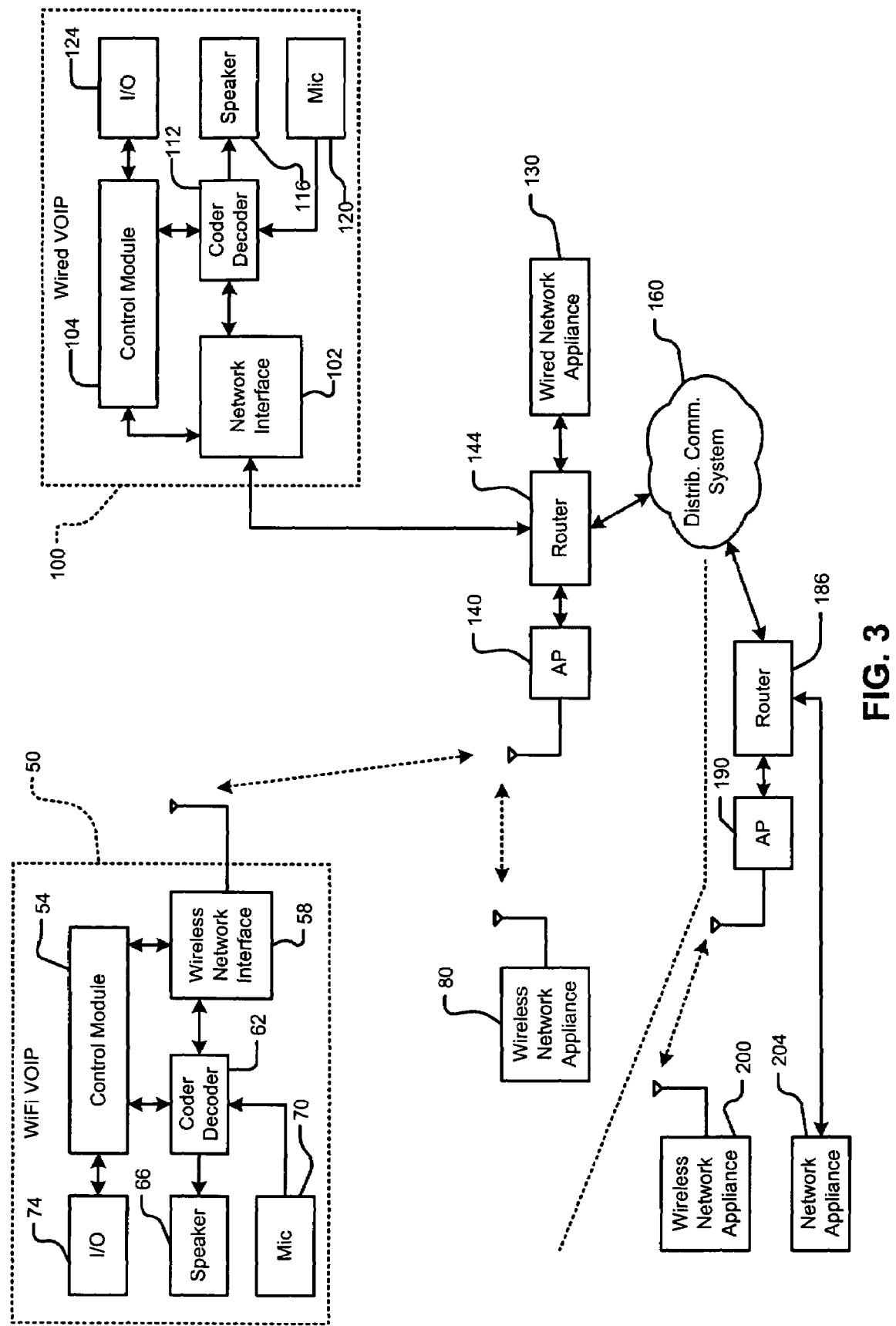
FIG. 3 is a functional block diagram of wireless and/or wired VOIP phones that selectively remotely control local and/or remote wireless and/or wired network appliances according to the present disclosure.

Referring now to FIG. 3, wireless and/or wired VOIP phones can also remotely control local and/or remote wireless and/or wired network appliances. As previously discussed above, the wireless VOIP phone 50 and/or wired VOIP phone 100 may also communicate and control wired and/or wireless network appliances that are located in remote networks. In a remote location, a router 186 and/or access point 190 receives packetized data. Packets are routed to the remote wireless network appliance 200 via the access point 190.

Figure 4:
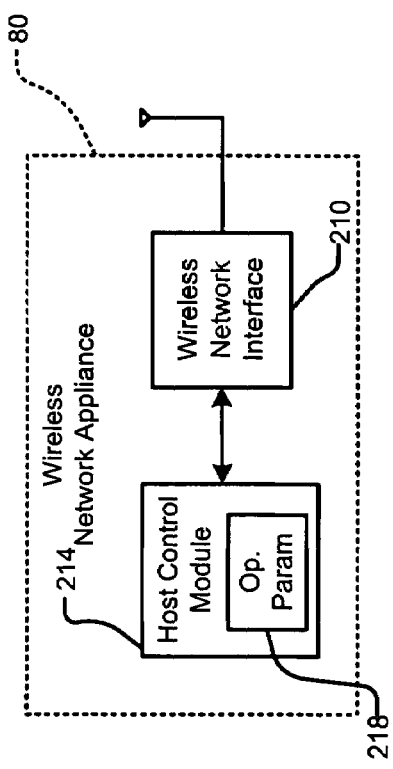
FIG. 4 is a functional block diagram of a wireless network appliance.

Referring now to FIG. 4, an exemplary wireless network appliance 80 is shown. The wireless network appliance 80 includes a wireless network interface 210. The wireless network interface 210 includes a physical layer (PHY) device that provides a wireless interface to a wireless medium and a medium access control (MAC) device that provides a wireless interface between the PHY device and a host device. The wireless network appliance 80 also includes a host control module 214. One or more operating parameters 218 of the wireless network appliance 80 may be remotely controlled. For example, the operating parameters 218 may include on/off control, volume control, operating mode, temperature and/or other suitable operating parameters.

Figure 5:
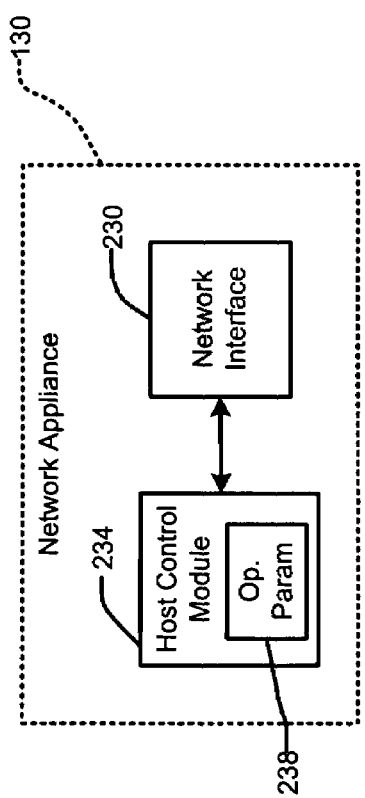
FIG. 5 is a functional block diagram of a wired network appliance.

Referring now to FIG. 5, an exemplary wired network appliance is shown. The wired network appliance 130 includes a wired network interface 230. The wired network interface 230 includes a PHY device that provides wired interface to a wired medium such as fiber or copper and a MAC device that provides an interface between the PHY device and a host device. The wired network appliance 130 also includes a host control module 234. One or more operating parameters 238 of the wired network appliance 130 may be remotely controlled. For example, the operating parameters 238 may include on/off control, volume control, operating mode, temperature and/or other operating parameters.

Figure 6A:
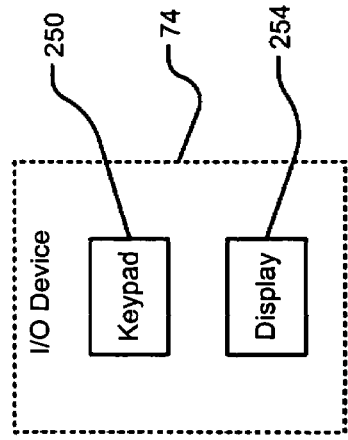
FIGS. 6A-6B illustrate exemplary input devices for the wireless and/or wired VOIP phones.
Figure 6B:
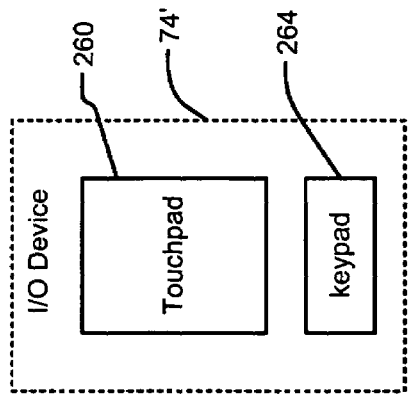

Referring now to FIGS. 6A-6B, exemplary input devices for the wireless and/or wired VOIP phones are shown. In FIG. 6A, the input/output device 74 includes a keypad 250 and a display 254. In FIG. 6B, the input/output device 74' includes a touchpad 260 and/or a keypad 264. Still other input/output interfaces may be provided by the input/output device 74 or 74'. The control modules of the devices in FIGS. 6A and 6B may also provide a graphical user interface. In some implementations, the network appliance sends a custom GUI and/or data relating to its inputs and outputs to the VOIP phone.

Figure 7A:
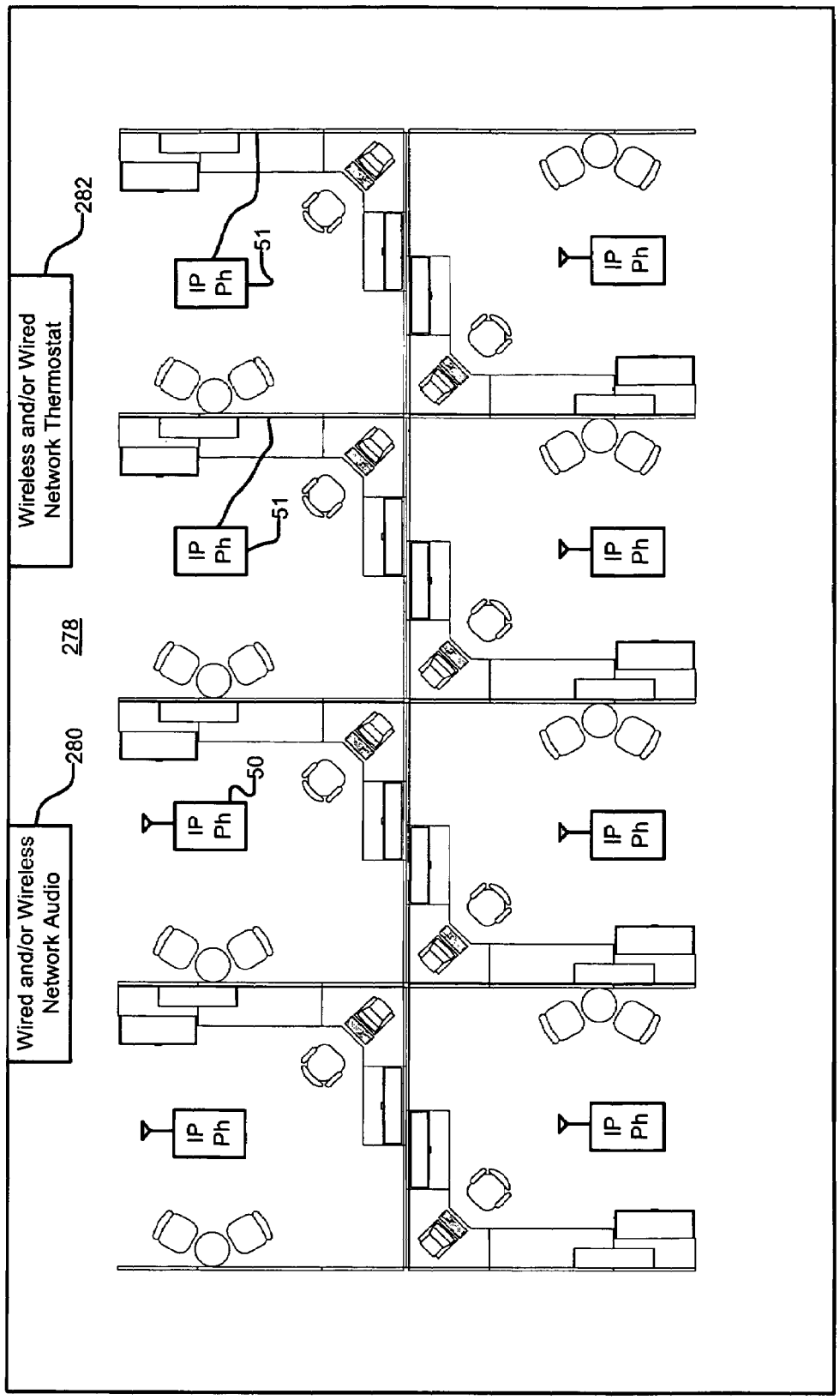
FIGS. 7A-7D illustrate control of exemplary network-enabled audio and/or temperature control systems using wireless and/or wired VOIP phones according to the present disclosure.

Referring now to FIGS. 7A-7D, an exemplary audio and/or temperature control system that employs wireless and/or wired VOIP phones is shown. In FIG. 7A, a plurality of employees work in office 278. Each of the employees may have a VOIP phone 50. The VOIP phones 50 selectively communicate with wired and/or wireless network appliances 280 and 282 using the input/output devices 74 described above. For example, the network appliance 280 may include a network-addressable audio system and the network appliance 282 may include a network addressable thermostat system for the office 278. The network appliances can be wireless and/or wired.

The employees use the input/output devices on their VOIP phones 50 and 51 to adjust operational parameters of the wireless and/or wired network appliances 280 and 282. For example, the wireless VOIP phones 50 and/or wired VOIP phones 51 may input a desired temperature to the wireless and/or wired network appliance 282 associated with the thermostat system. In some implementations, the thermostat system may choose a setpoint based upon a prestored program, a single requested setpoint, and/or as a function of multiple requested setpoints. For example, an average of multiple desired temperatures input by the VOIP phones may be used when multiple setpoints are requested. A time-based weighted approach may be used with more current setpoint requests being given greater weight. In some implementations, the VOIP phones may be used to add songs to a playlist associated with the wireless and/or wired network appliance 280 that controls the audio system, select a different source component, adjust volume, etc.

Figure 7C:
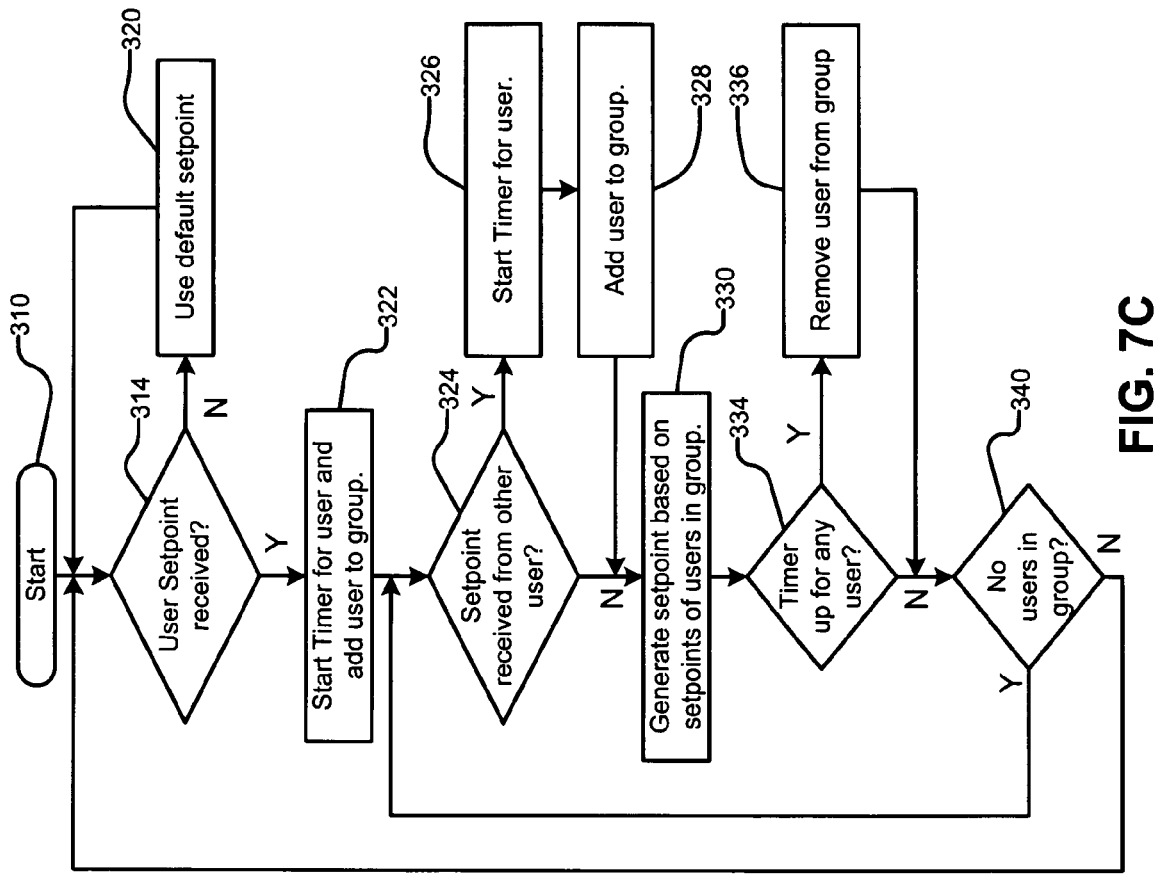
Figure 7B:
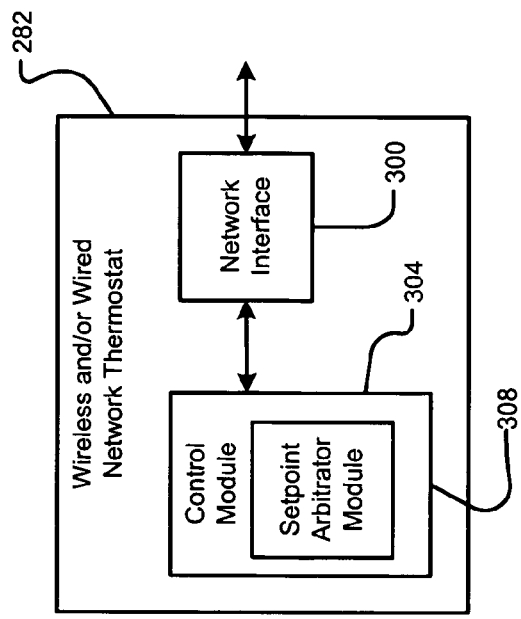

In FIG. 7B, the wireless and/or wired network thermostat 282 is shown in further detail. The wireless and/or wired network thermostat 282 includes a wireless and/or wired network interface 300. In addition, the wireless and/or wired network appliance 282 includes a control module 304. The control module 304 may include a setpoint arbitrator module 308, which controls the temperature setpoint based upon none, one or multiple temperature setpoint inputs from the wireless and/or wired VOIP phones 50 as described above.

In FIG. 7C, steps of an exemplary control method for controlling the wireless and/or wired network device 282 associated with thermostat is shown. Control begins in step 310. In step 314, control determines whether a user setpoint is received. If step 314 is false, control uses a default setpoint and/or temperature program in step 320. If step 314 is true, control starts a timer for the user and adds the user to a group in step 322.

In step 324, control determines whether a setpoint is received from another user. If step 324 is true, control starts a timer associated with the user and adds the user to the group in steps 326 and 328, respectively. If step 324 is false, control generates a setpoint based on setpoints of users in the group in step 330. In step 334, control determines whether a timer associated with any user is up.

If step 334 is true, control removes the user from the group in step 336. Control continues from steps 336 and step 334 (if step 334 is false) with step 340. In step 340, control determines whether there are any users remaining in the group. If step 340 is true, control returns to step 324. Otherwise, control returns to step 314.

Figure 7D:
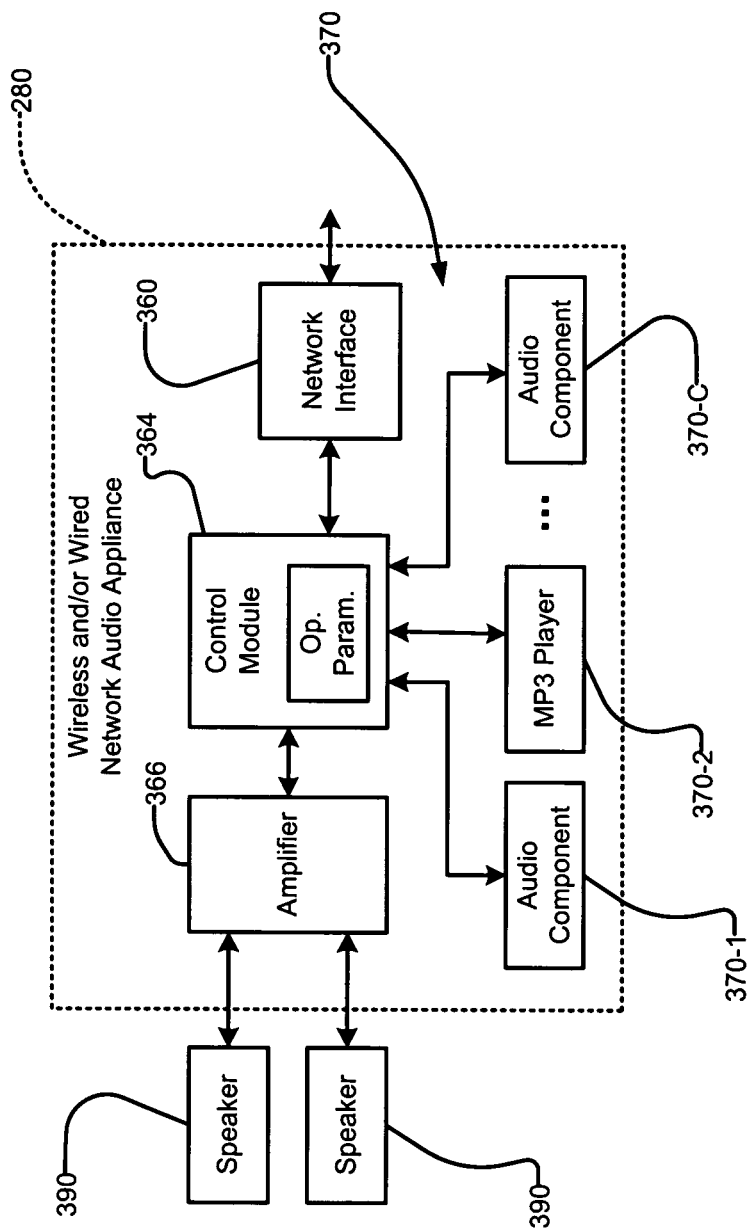

In FIG. 7D, an exemplary block diagram of the wireless and/or wired network appliance 280 is shown. The wireless and/or wired network appliance 280 includes a wireless and/or wired network interface 360. The network interface 360 communicates with a control module 364, which controls the wireless and/or wired network appliance 280. The control module 364 stores one or more operating parameters 365 of the wireless and/or wired network appliance 280. One or more audio components 370-1, 370-2, . . . and 370-C (collectively audio components 370) may be connected to the control module 364 and/or an amplifier 366.

One or more operating parameters of the wireless and/or wired network appliance may be controlled remotely as described above. For example, the source audio component 370 and/or operating parameters of the source component can be selected remotely. For example, one of the audio components 370 may be a FM receiver that may be selected as the output. The audio from the selected source audio component 370 is output to the amplifier 366, which is connected to one or more speakers 390. Additional operating parameters may include traditional control functions of the particular audio component 370 such as volume control, fade, balance, etc. In some implementations, the control module 364 and amplifier 366 can be integrated into a single device.

In addition to the foregoing, two or more of the control module, coder/decoder, wired and/or wireless network interface can be integrated into a system on chip (SOC). The VOIP phones and/or network appliances may employ http protocol, XML, and/or any other protocol. These devices may operative using Microsoft, Linux or other operating systems. Other exemplary network appliances include but are not limited to heating, ventilation and air conditioning (HVAC), lighting, hot tubs, etc.

As can be appreciated, while the speech recognition module 145 was shown in conjunction with FIG. 2, the speech recognition module may be associated with other embodiments described herein. Furthermore, the speech recognition module 145 may be associated with other devices on the network and/or the VOIP phone.

Figure 8B:
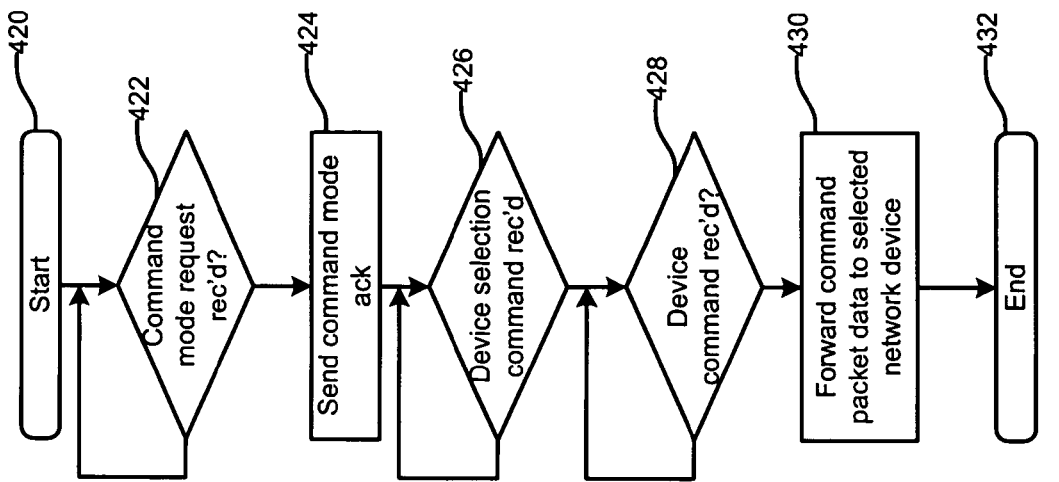
FIG. 8B is a flowchart illustrating exemplary steps for operating a speech recognition module.
Figure 8A:
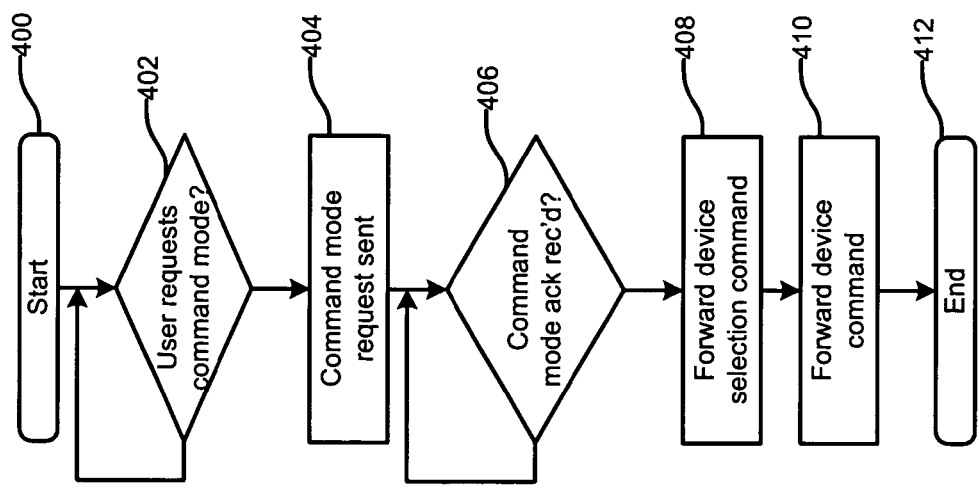
FIG. 8A is a flowchart illustrating exemplary steps for using speech commands and the VOIP phone to control a remote network appliance.

Referring now to FIGS. 8A and 8B, control relating to the VOIP phone and the speech recognition module 145 is shown. In FIG. 8A, control relating to the VOIP phone begins in step 400. In step 402, control determines whether the user of the VOIP phone requests a command mode. As set forth above, the user may request a command mode using speech and/or using the input/output devices of the VOIP phone. If step 402 is true, control sends a command mode request to the remote speech recognition module.

In step 406, control determines whether a command mode acknowledgement has been received. The command mode acknowledgement may be sent in packets and/or on control channels. The VOIP phone may acknowledge the receipt using a tone, turning on a light, sending a message to the display or any other method to indicate to the user that the command mode has been enabled. Then in step 408, the user identifies the selected network appliance if more than one network appliance can be controlled and the VOIP phone forwards the device selection command to the speech recognition module. In step 410, the user inputs the network appliance command, which is forwarded to the speech recognition module. Control ends in step 412.

Referring now to FIG. 8B, control relating to the speech recognition module is shown. In step 422, control determines whether a command mode request has been received from the VOIP phone. As can be appreciated, more than one VOIP phone may be associated with the speech recognition module. If step 422 is true, the speech recognition module sends a command mode acknowledgement in step 424. In step 426, control determines whether a device selection command has been received. If step 426 is true, control determines whether a device command has been received in step 428. If step 428 is true, control forwards the command packet to the selected network appliance in step 430. Control ends in step 432. As can be appreciated, time-outs can be associated with steps 402, 406, 426 and 428 to prevent an endless loop.

Figure 9:
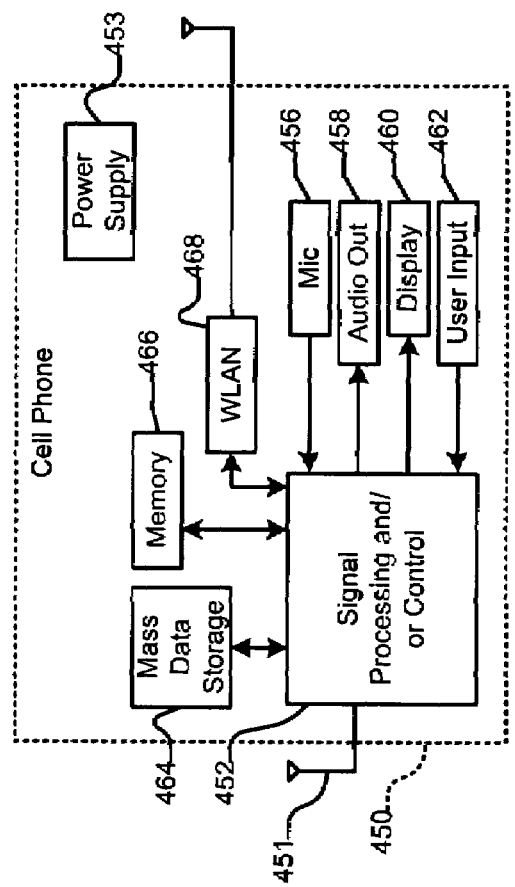
FIG. 9 is a functional block diagram of a cellular phone that incorporates VOIP functionality and can remotely control a network appliance.

Referring now to FIG. 9, the device can be implemented in a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 10:
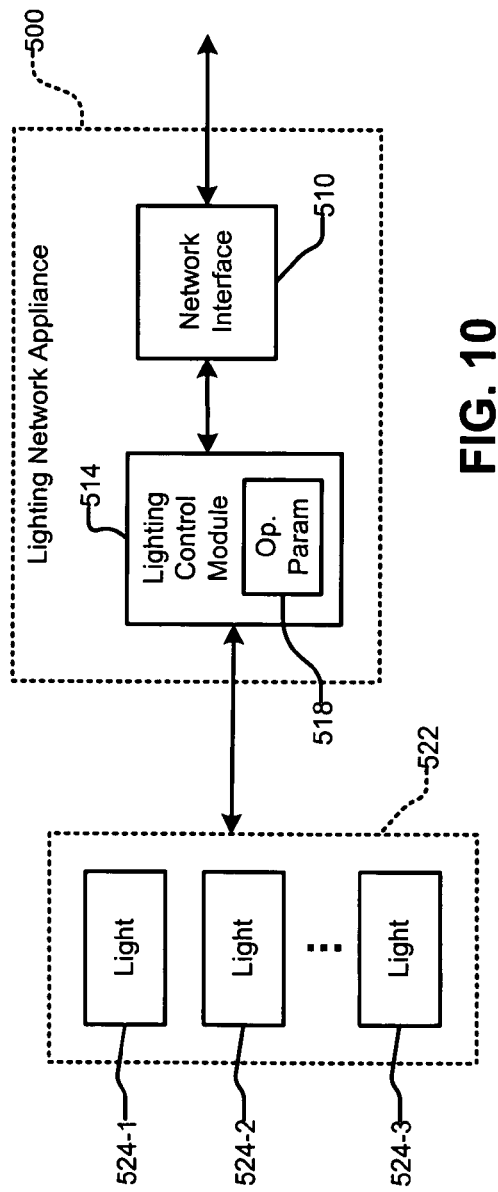
FIG. 10 is a functional block diagram of a lighting network appliance.

Referring now to FIG. 10, a functional block diagram of a lighting network appliance 500 is shown to include a lighting control module 514. A wired and/or wireless network interface 510 provides network connectivity as described above. The lighting control module 514 allows a user to control one or more operating parameters of one or more lights 522. For example, lights 524-1, 524-2, ..., 524-N can be controlled for one or more rooms to provide mood lighting, timed operation, dimming, on/of control, etc.

Figure 11:
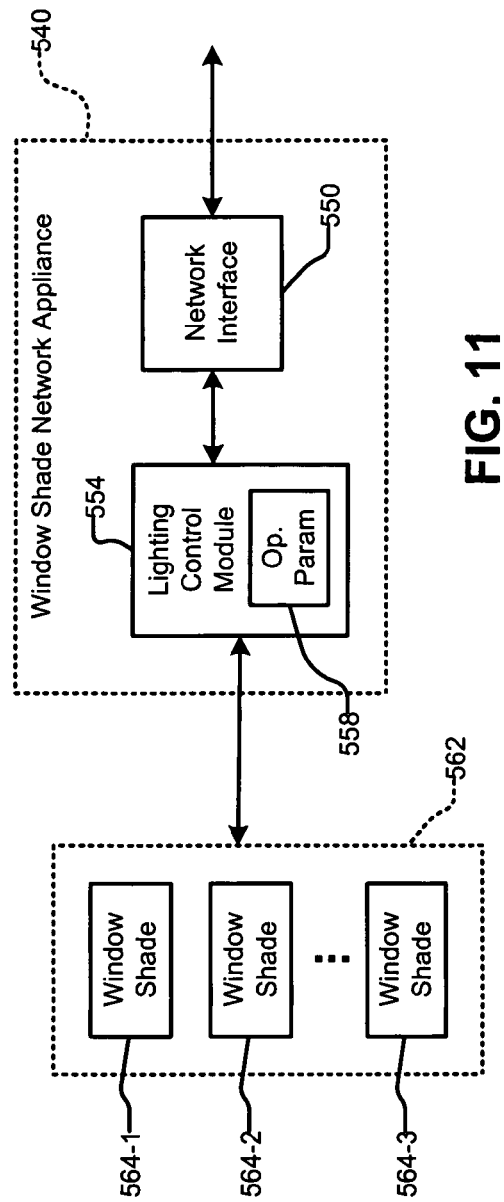
FIG. 11 is a functional block diagram of a window shade network appliance.

Referring now to FIG. 11, a functional block diagram of a window shade network appliance 540 is shown to include a window shade control module 554. A wired and/or wireless network interface 550 provides network connectivity as described above. The window shade control module 554 allows a user to control one or more operating parameters of one or more window shades 562. For example, window shades 564-1, 564-2, ..., 564-N can be controlled for one or more rooms to open shades, close shades, partially open/closed positions, etc.

The VOIP phones described herein can select multiple network appliances at the same time and address commands to the multiple devices in a multicast manner. For example, multiple lights and/or window shades can be selected and adjusted the same way at the same time.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
   a network appliance;
   a Voice Over Internet Protocol (VOIP) phone including
      a microphone configured to i) receive a voice command to adjust an operating parameter of the network appliance, and ii) output an audio signal corresponding to the voice command,
      a coder/decoder module configured to convert the audio signal into a corresponding compressed digital signal, and
      a network interface configured to transmit the compressed digital signal to the network appliance to adjust the operating parameter of the network appliance; and
   a setpoint temperature arbitrator configured to select i) a setpoint temperature based on a setpoint program when no setpoint temperatures have been received within a first predetermined period, ii) a single setpoint temperature when one setpoint temperature has been received within a second predetermined period, and iii) a function of a plurality of setpoint temperatures when more than one setpoint temperature has been received within a third predetermined period.

2. The system of claim 1, wherein the network interface includes a wireless network interface.

3. The system of claim 1, wherein the network interface includes a wired network interface.

4. The system of claim 1, wherein the network appliance includes a wireless network interface.

5. The system of claim 1, wherein the network appliance includes a wired network interface.

6. The system of claim 1,
   wherein the network appliance is wireless and is configured to communicate with the VOIP phone using at least one of an infrastructure mode and a peer-to-peer mode.

7. The system of claim 1,
   wherein the network appliance is a wired network appliance configured to communicate with the VOIP phone.

8. The system of claim 3, further comprising:
   a router configured to communicate with the wired network interface; and
   a wired network appliance configured to communicate with the VOIP phone via the router.

9. The system of claim 1, wherein the network appliance is located in a remote network.

10. The system of claim 1,
    wherein the network appliance comprises at least one of a thermostat, an audio system, a light, and a window shade.

11. The system of claim 1, wherein the VOIP phone includes at least one of a keypad, a touchpad and a display for receiving user input to alter the operating parameter of the network appliance.

12. The system of claim 1, further comprising:
    a router in communication with the VOIP phone, the router including a speech recognition module configured to i) perform speech recognition on the compressed digital signal, and ii) generate a corresponding command for the network appliance based on the speech recognition.

13. A method of operating a Voice Over Internet Protocol (VOIP) phone, the method comprising:
    receiving a voice command at the VOIP phone to adjust an operating parameter of a network appliance;
    outputting an audio signal corresponding to the voice command;
    converting the audio signal into a corresponding compressed digital signal;
    transmitting the compressed digital signal to the network appliance using a network interface to adjust the operating parameter of the network appliance; and
    selecting i) a setpoint temperature based on a setpoint program when no setpoint temperatures have been received within a first predetermined period, ii) a single setpoint temperature when one setpoint temperature has been received within a second predetermined period, and iii) a function of a plurality of setpoint temperatures when more than one setpoint temperature has been received within a third predetermined period.

14. The method of claim 13, wherein the network interface includes a wireless network interface.

15. The method of claim 13, wherein the network interface includes a wired network interface.

16. The method of claim 13, wherein the network appliance includes a wireless network interface.

17. The method of claim 13, wherein the network appliance includes a wired network interface.

18. The method of claim 14, further comprising communicating with the VOIP phone using one of a peer-to-peer mode and an infrastructure mode.

19. The method of claim 13, further comprising locating the network appliance in a network that is remote from a network communicating with the VOIP phone.

20. The method of claim 13, further comprising controlling at least one of a thermostat, an audio system, a window shade and a light.

21. The method of claim 13, further comprising providing at least one of a keypad, a touchpad and a display at the VOIP phone for receiving user input to alter the operating parameter of the network appliance.

* * * * *